Figure 1:
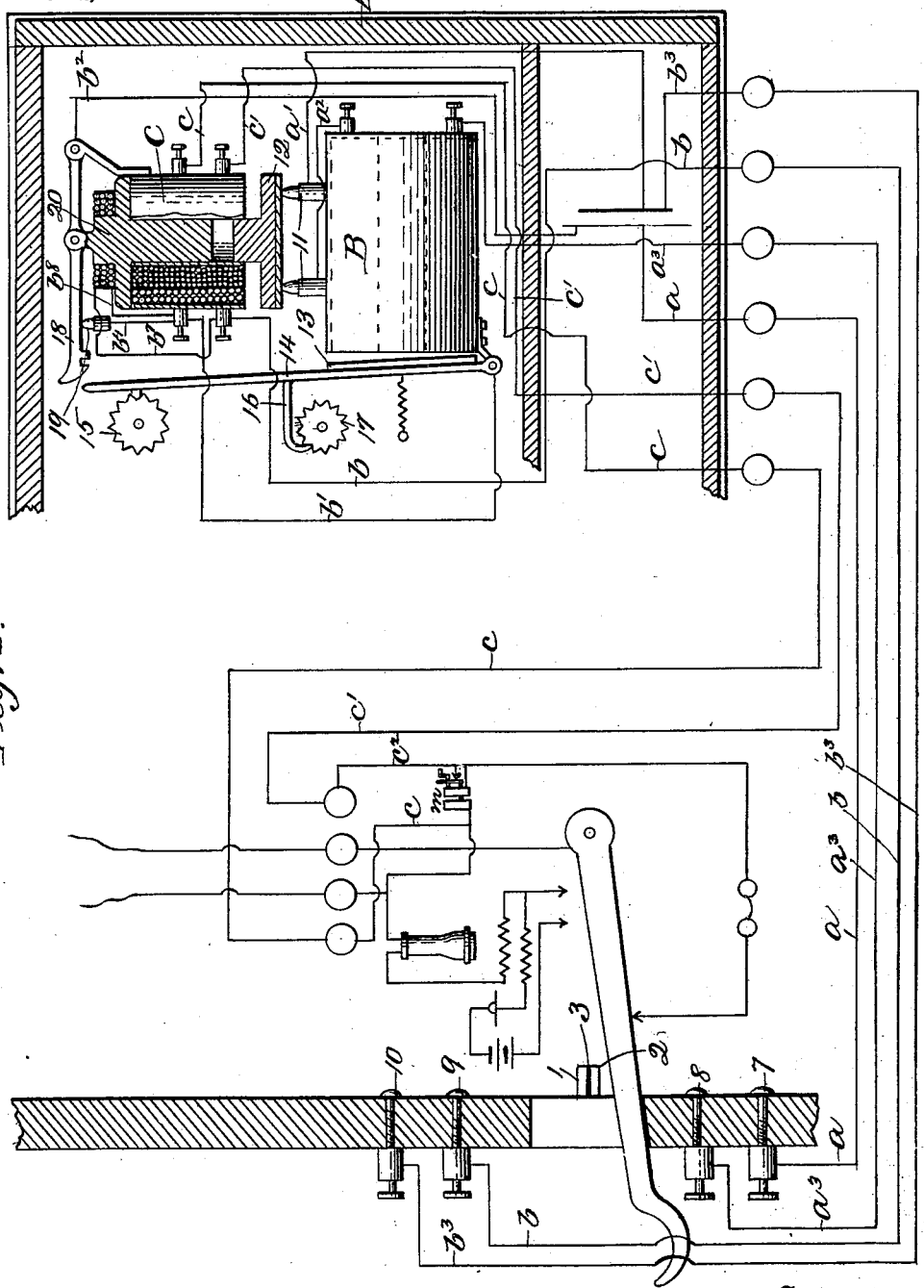

No. 691,450. Patented Jan. 21, 1902.
R. & W. H. DAVIS & D. C. WOODBURY.
RECORDING SYSTEM.
(Application filed Feb. 16, 1901.)
(No Model.) 4 Sheets—Sheet 2.

Witnesses
Albert B. Blackwood.
Spencer B. Prentiss.

Inventors
Robert Davis
Wm. Hammatt Davis
Daniel C. Woodbury

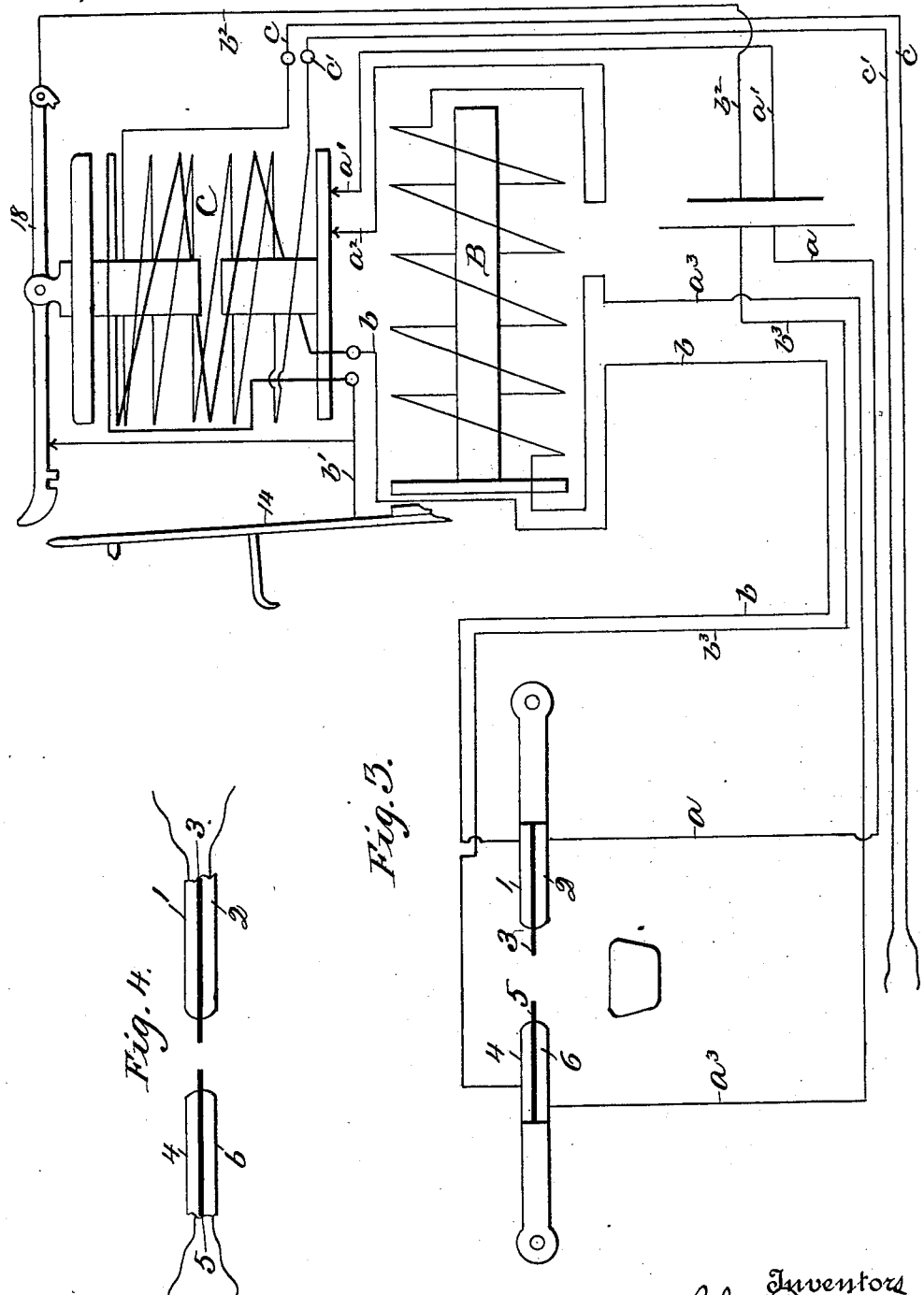

No. 691,450. Patented Jan. 21, 1902.
R. & W. H. DAVIS & D. C. WOODBURY.
RECORDING SYSTEM.
(Application filed Feb. 16, 1901.)
(No Model.) 4 Sheets—Sheet 4.
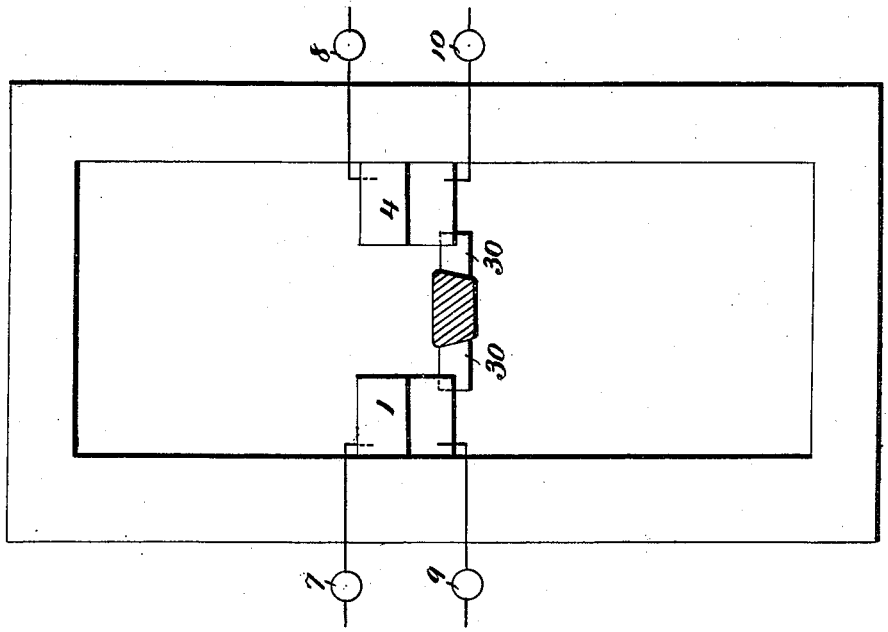
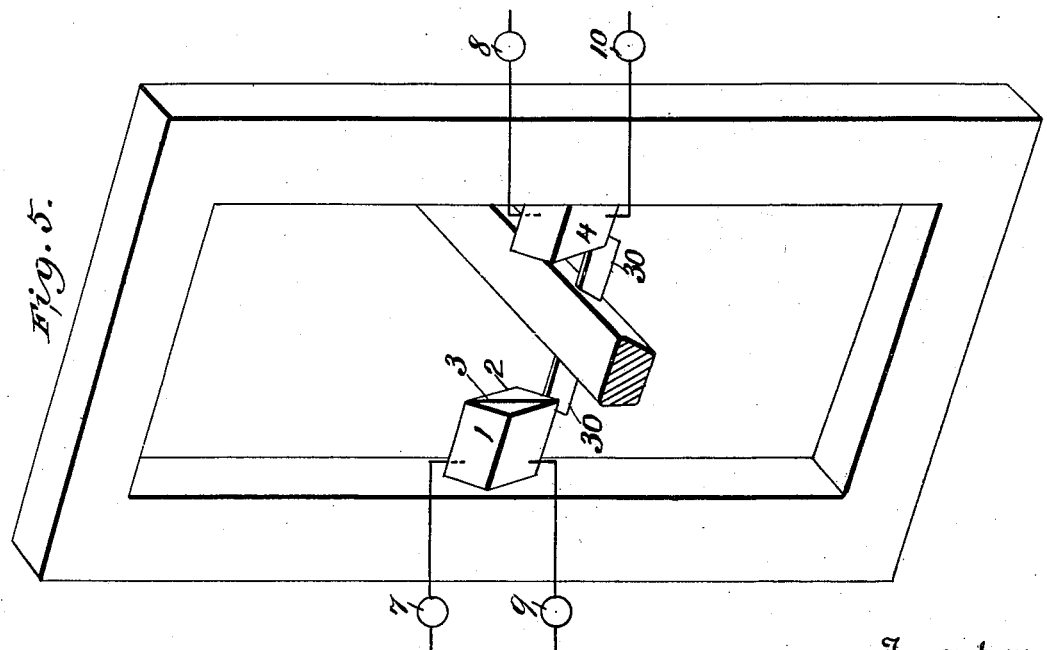
Witnesses
Albert B Blackwood.
Jas H Blackwood
Inventors
Robert Davis
Wm Hammatt Davis
Daniel C. Woodbury
THE NORRIS PETERS CO., PHOTO-LITHO., WASHINGTON, D. C.

UNITED STATES PATENT OFFICE.

ROBERT DAVIS AND WILLIAM HAMMATT DAVIS, OF WASHINGTON, DISTRICT OF COLUMBIA, AND DANIEL C. WOODBURY, OF HOBOKEN, NEW JERSEY.

RECORDING SYSTEM.

SPECIFICATION forming part of Letters Patent No. 691,450, dated January 21, 1902.

Application filed February 16, 1901. Serial No. 47,600. (No model.)

*To all whom it may concern:*

Be it known that we, ROBERT DAVIS and WILLIAM HAMMATT DAVIS, residents of Washington, in the District of Columbia, and DANIEL C. WOODBURY, residing at Hoboken, in the county of Hudson and State of New Jersey, citizens of the United States, have invented certain new and useful Improvements in Recording Systems, of which the following is a specification.

Our invention relates generally to recording devices for use in connection with any sort of apparatus where it is desired to record either the number of times the apparatus has been put into operation or the total amount of time the apparatus has been in operation, or both the number of times and the total amount of time; and the invention also relates more particularly to improvements in recording devices for use in connection with telephones or similar signaling apparatus.

While the invention has been illustrated and described in this specification as applied to telephones, it is to be understood that we do not limit ourselves to such use and that certain features of our invention are capable of a much wider application. With this understanding we will proceed to describe our invention as applied to telephones, considering any further reiteration of the above statement of its application unnecessary and that to attempt to describe the invention in connection with all the systems to which it might be applicable would only serve to detract from the clearness and conciseness of the specification.

Our object is to produce a recording device which shall either register the number of times the apparatus to which it is attached has been used or measure the total amount of time during which the apparatus has been in use, or both, and which shall be wholly automatic and capable of being brought into operation by the mere actuation of the apparatus to which it is attached without any additional act on the part of the person who actuates the apparatus; and in connection with telephone and similar signaling systems in which there is a central exchange and one or more local stations our object is to provide a recording device which may be placed at a local station and in which a call shall affect the recording device at the station which initiates the call, but shall not affect the recording device at the station which receives the call, which shall not require any special act on the part of the operator at the local station for its operation, which shall not require any additional line-wires, which shall not require for its operation any act on the part of the central operator in addition to those acts commonly performed in answering and sending calls and in making the proper connections, and which shall necessitate no essential modification of the systems and apparatus now in use.

We are aware that meters for measured telephone service have heretofore been devised for use at the subscribers' stations; but owing to the fact that all of these meters have required some special act on the part of the subscriber to put them into operation and as telephone practice has demonstrated that the subscriber cannot be relied upon to perform such acts properly the tendency has been to place such meters at the central exchange. This, however, is objectionable, as it increases the already complicated wiring of the exchange-switchboard and demands space which cannot well be spared. Moreover, subscribers have expressed a strong desire to have the meters on their own premises subject to their own inspection in order to do away with any possibility of fraudulent overcharge by the telephone companies.

In order to fulfil the objects and overcome the objections above mentioned, we have made the present invention, the principles of which will now be described in detail, together with a convenient form of their application.

Figure 2:
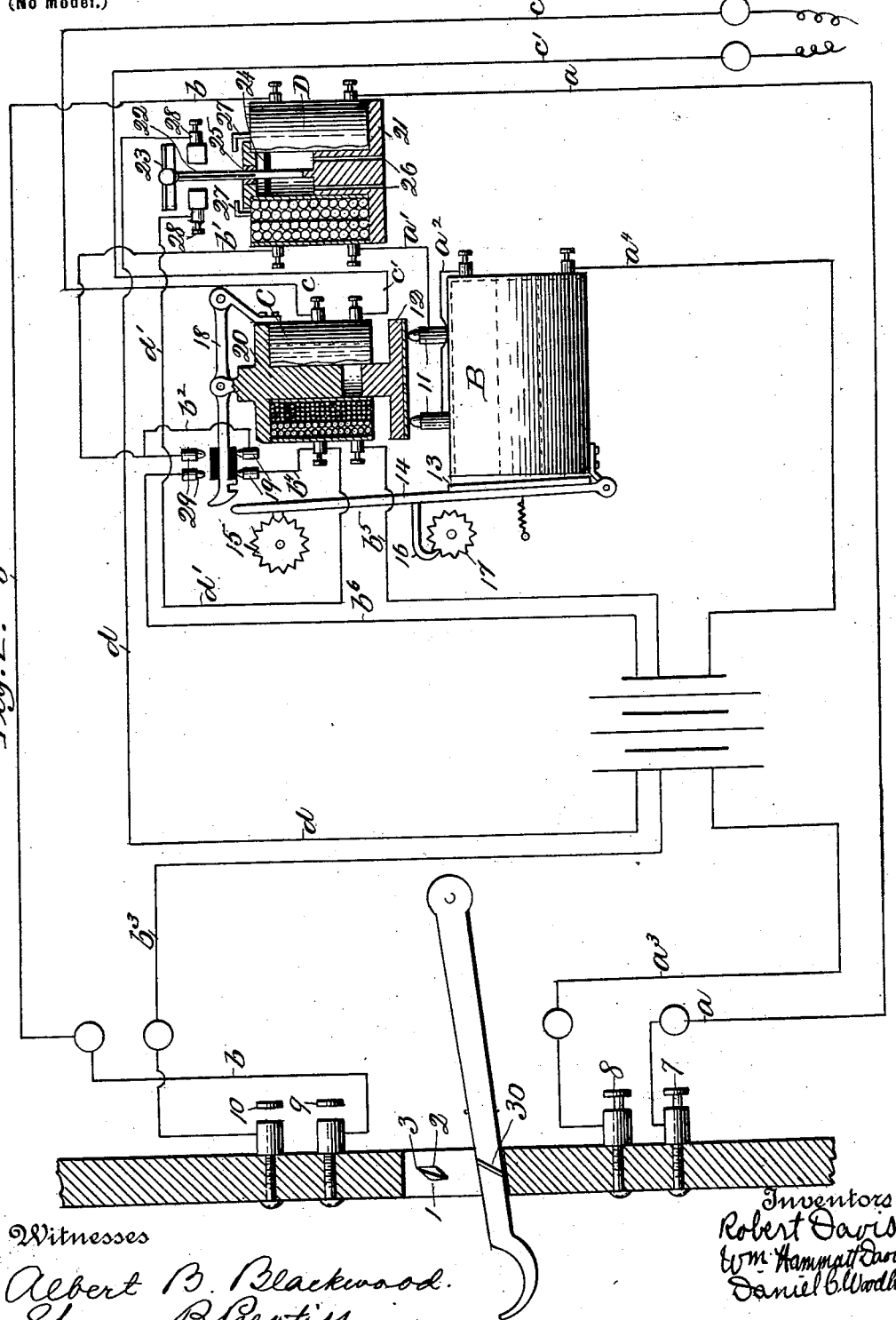

In the drawings, Figure 1 illustrates our recording system applied to a magneto-call telephone system. Fig. 2 illustrates the same recording system, with certain modifications, applied to a common-battery telephone system. Fig. 3 is a diagrammatic view of the recording system. Fig. 4 is a detail view of a contact making and breaking device for use in connection with our recording system, and Figs. 5 and 6 are detail views of a modified form of contact making and breaking device.

Like reference characters refer to corresponding parts in the different views.

In Fig. 1, A is a box containing the recording device and its controlling means, and on the left-hand side of the figure is shown a section of the side of an ordinary telephone-box and a diagrammatic illustration of the interior connections of a magneto-call telephone.

Before describing the operation of the apparatus we call attention to Fig. 4, which is a detail view of the contacts shown in Fig. 1 as projecting into the opening in the side of the box, in which opening the receiver-arm of the telephone moves. One of these contact-pieces is placed on each side of the opening and projecting into the path of the receiver-arm. The contact-pieces are composed of two strips of conducting material, as 1 and 2, separated by a flexible strip of insulating material, as 3. Strip 1 is electrically connected to binding-post 9, strip 4 to binding-post 10, strip 2 to binding-post 7, and strip 6 to binding-post 8. By this arrangement of contact-pieces when the receiver-arm of the telephone rises it makes contact between strips 2 and 6, but in passing bends back the insulating-strips, and so does not make contact between strips 1 and 4. When the arm descends, contact is in like manner made between strips 1 and 4 and not between strips 2 and 6.

The operation of the system is as follows: When a subscriber desires to send a message, he lifts the receiver off the hook, whereupon the arm rises and by making contact between the strips 2 and 6 completes the following circuit: strip 2, binding-post 7, wire $a$, battery, wire $a'$, contact-points 11, which are connected by a conducting-plate on armature 12, wire $a^2$, through magnet B, wire $a^3$, binding-post 8, strip 6, and through the receiver-arm to strip 2 again. The current flowing in this circuit energizes the magnet B and causes it to draw up the disk armature 13 and with it the arm 14, to which it is attached. This withdraws a lug from engagement with the teeth of the wheel 15 and allows a time-recording device to start. It also causes the arm 16 to move the wheel 17 one point, and thus record the call. The arm 14 is held in its raised position by a notch in the arm 18. Connections are made by the receiver-arm and conversation carried on in the usual manner. In this construction the subscriber in turning his magneto-handle breaks the circuit $c\,c'$, which corresponds in position to the ordinary magneto automatic shunt used in telephones. A current is thus sent over the line to central without energizing the circuit $c\,c'$. When the conversation is ended, the subscriber replaces his receiver on the hook, thus drawing down the arm and completing the following circuit: plate 1, post 9, wire $b$, one coil of magnet C, wire $b'$, (since the circuit $b^4$ is broken by the arm 18 being held away from the contact 19 by the arm 14,) arm 14, arm 18, wire $b^2$, battery, wire $b^3$, post 10, strip 4, and through receiver-arm to strip 1. This energizes the magnet C, repels the armature 20, and thus raises the arm 18 and releases the arm 14 and stops the time-recording device. The armatures 12 and 20 are polarized, so that current which repels the armature 12 will also repel the armature 20. Each call initiated by the subscriber is thus registered and the duration of the call recorded, and it will be noted that this recording is entirely automatic and is accomplished independently of the ordinary telephone connections and without interfering with them in any way.

In Fig. 1, $m$ is a diagrammatic illustration of a magneto-machine equipped with the ordinary automatic shunt connections and interrupting means therefor.

In cases where the call is not initiated by the subscriber, central sending a calling-current over the line energizes the circuit $c\,c'$, which is in shunt to the armature of the magneto. This circuit $c\,c'$ should be of low resistance in order to be an effective shunt. The calling-current flows through the wire $c$, second winding of magnet C, which is wound in an opposite sense to the first winding, wire $c'$, binding-post on top of telephone, wire $c^2$, bells, and through the arm and back to line or to ground, depending upon the connections of the telephone. The magnet C is thus energized in such manner as to draw up the armature 12, which is polarized sufficiently to be held up by the iron shell of the magnet after the current stops. This opens the circuit $a\,a'$ at the contact-points 11, so that when the subscriber answers the call and lifts off the receiver the magnet B will not be energized and the recording device will not start or register a call. Now when the receiver is replaced at the end of the conversation the circuit is as follows: plate 1, post 9, wire $b$, first winding of magnet C, wire $b^4$, (since the arms 18 and 14 are separated and the circuit $b'$, &c., thus broken,) contact 19, arm 18, wire $b^2$, battery, wire $b^3$, post 10, strip 4, and through receiver-arm to strip 1 again. This energizes the magnet C and repels armature 12, thus leaving the recording device in condition for another call.

It will be seen that by this construction we have provided a recording system which will automatically register the number of calls initiated by the subscriber and which will measure the total length of time over which these calls extend and which is not affected by calls not initiated by the subscriber. The construction of the time-measuring and call-registering mechanism is not shown, as the same forms no part of our invention. Obviously either the time-measuring or the call-registering device, or both, may be used, as desired.

Fig. 2 shows a modified form of our recording system as it would be arranged when applied to a common-battery telephone system; but before proceeding to a detailed description of the system shown in this figure we will describe the nature and object of the magnet D and its connections and attachments.

It often happens that a subscriber who has called central and been obliged to wait some time for an answer becomes impatient and pulls down the receiver-arm and rings his magneto a second time, or in common-battery systems shakes his receiver up and down. In the system just described each time he did this he would register an extra call on his recording device. To overcome this objection, we have introduced into the system controlling the recording device a time-lag. One form of apparatus for introducing this lag is shown in Fig. 2 and will be described in connection therewith, though we do not intend to limit ourselves to this specific form. This time-lag apparatus has been shown in connection with a common-battery system; but obviously it may be applied as well to any other system to which our recording system is applicable. This lag may of course be omitted entirely, if desired. In the specific form shown the lag device consists of a magnet D, with its attachments and connections. The armature 21 of this magnet D has fastened to it a rod 22, which carries a contact-plate 23 and a collar 24. This collar fits snugly into the interior of the magnet-solenoid D, which may be lined with brass or similar material, if desired. On the top of the solenoid and fitting snugly in the central opening thereof is a cap 25. This cap may be made of polarized magnetic material, so as to be attracted by the solenoid and drawn tightly into the opening. When the solenoid is energized through circuit $b\ b'$, &c., the armature 21 is repelled; but owing to the fact that the space between the collar 24 and the cap 25 is almost air-tight the rate of fall of the armature will be retarded, and the fall will take place only so fast as air can enter the space between collar 24 and cap 25. The armature in its fall will bring the plate 23 into engagement with the contacts 28 28, and thus complete the circuit $d\ d'$, &c. The length of time that will elapse between the energization of the magnet D (and the consequent repulsion of the armature 21) and the making of contact between plates 28 28 will depend on the rate of fall of the armature and on the original distance between plate 23 and plates 28 28. Of course it would be possible to regulate either of these factors to effect regulation of this lapse of time; but we prefer to regulate the relative position of the contact-plates instead of regulating the fall of the armature in any way, as by regulating the admission of air to the space between the collar 24 and cap 25 by increasing or diminishing the weight of the armature or increasing or diminishing the repelling power of the solenoid. We have therefore shown the plate 23 fixed to the rod 22 by a set-screw, which may be moved up and down in a slot in said rod and set at any desired position. We do not intend to limit ourselves to the regulation of the relative position of the contact-plates, but may effect the regulation in any desirable way. The cap 25 may be provided with a collar of brass or other non-magnetic material for the rod 22 to slide through, and this rod may of course be made of any suitable material. The space between the collar 24 and the armature 21 is in communication with the atmosphere through holes 26, bored in the armature 21. These channels may or may not be used, as desired, and, if desired, the core 21 may be extended up to meet the cap 25 and the collar 24, thus done away with; but this would necessitate making the core 21 fit the interior of the solenoid so tightly as to be almost air-tight. When the solenoid is energized through circuit $a\ a'$, &c., it attracts the armature 21, and as the armature rises the cap 25 is raised, and air is thus allowed to flow freely from the space between the cap and the collar 24, and the rise of the armature is thus not impeded. The pins 27 serve to prevent the cap 25 from being carried up by the rod 22 as the armature rises.

The contacts with which the receiver-arm coöperates are shown in Fig. 2 as of a different form from those shown in Fig. 1. Here the receiver-arm carries a flexible projection 30 of conducting material on each side, and these projections are set at an angle to the vertical, so that when the arm rises it will make contact with one side of the inclined contact-plates, as 3, and as the arm descends it will make contact with the other side of the contact-plates, as 1, through the contact projections 30. The arrangement of these contacts and their connections with the binding-posts 7, 8, 9, and 10 are more fully illustrated in Figs. 5 and 6. With these modifications the operation of the system shown in Fig. 2 is as follows: When the receiver-arm rises on a call initiated by the subscriber, it completes the following circuit: wire $a$, one winding of magnet D, wire $a'$, contacts 11, wire $a^2$, magnet B, wire $a^4$, battery, and wire $a^3$, the connections from the binding-posts 7 and 8 to plates 2 and 6 being the same as in Fig. 1. The recording device is thus started and the armature of magnet D is left in a raised position. If now the arm is pulled down, the circuit is as follows: plate 1, binding-post 9, wire $b$, second winding on magnet D, which is wound in an opposite sense to the first, wire $b'$, contacts 29, connected by conducting-plate on arm 18, wire $b^6$, battery, wire $b^3$, post 10, plate 4, and through receiver-arm to plate 1 again. This energizes magnet D in such a way as to repel armature 21, which falls slowly, owing to the dash-pot construction described. When the contact-plate 23 reaches the contacts 28, it completes the following circuit: plate 28, wire $d$, battery, wire $b^5$, first winding of magnet C, wire $d'$, and back to other plate 28. This energizes the magnet C and by repelling the armature 20 stops the recording device. It will be seen that if the subscriber pulls down his receiver-arm and lets it rise again before the contact-plate 23 has had time to reach the plates 28 the armature 21 will be lifted again without completing the circuit $d\ d'$, and thus without stopping the meter. It is possible, as above stated, to so regulate this dash-pot arrangement that any desired time will elapse between the pulling down of the receiver-arm and the completion of the circuit $d\ d'$. In a system where the subscriber has to ring his magneto to call the attention of central, as in a magneto-call system, it would probably be necessary to have this lapse of time longer than in a common-battery system. The circuit $c\ c'$ in this figure is substantially the same as in Fig. 1, excepting that here there is no magneto and the circuit $c\ c'$ would simply be in series with the calling-circuit instead of in shunt to the magneto-armature. If the subscriber lifts his receiver after having been called by central in this system, as in that of Fig. 1, the recording device will not be affected. When at the end of such a conversation the subscriber replaces his receiver, the circuit is as follows: plate 1, post 9, wire $b$, magnet D, wire $b'$, wire $b^2$, contacts 19, wire $b^4$, magnet C, wire $b^5$, battery, wire $b^3$, post 10, plate 4, and through receiver-arm to plate 1 again. This repels armature 12 and leaves the telephone in condition for further use.

Fig. 3 is a diagrammatic view of the system shown in Fig. 1 and will require no further explanation.

Figs. 5 and 6 are detail views illustrating the operation of the contacts shown in Fig. 2 and the connections to the binding-posts 7, 8, 9, and 10.

In Fig. 1 we have shown a circuit $b^7\ b^8$ wound on the armature 20. This circuit is a shunt from the binding-posts on the left-hand side of magnet C and is wound in a direction opposite to the direction of winding of the coil of magnet C, which is connected to these binding-posts. The object of this circuit is to magnetize the armature 20 in a sense opposite to that of the winding of the magnet C, to which it is in shunt. This winding may be used instead of permanently polarizing the armature 20, and a like winding may be applied to the armature 12, if desired.

While our recording system is especially adapted for use at the subscriber's station, it is obvious that certain features of the system are applicable equally to use in connection with a recording system located at the central station or any other desired point.

We do not limit ourselves to the particular construction and arrangement of parts herein shown and described, but claim as our invention, and desire to secure by Letters Patent, the following:

1. In a system for recording the operation of apparatus, a recording device which in its normal condition is automatically actuated by each operation of the said apparatus, and means beyond the control of the local operator for placing the recording device in an abnormal condition and thereby preventing its actuation upon an operation of the said apparatus.

2. In a system for recording the operation of apparatus, a recording device normally restrained from operation, means automatically acting, when the apparatus is in its normal condition, to remove the restraint and permit the recording device to perform its function upon each operation of the said apparatus, and means beyond the control of the local operator for placing the removing means in an abnormal condition and thereby preventing its actuation upon an operation of the said apparatus.

3. In a system for recording the operation of apparatus, a recording device brought into operation by electrical energy in a local circuit, and means beyond the control of the local operator for interrupting the local circuit.

4. In a measured-service signaling system, a signaling device, a signal-recording device, an independent source of energy for actuating said recording device, means automatically actuated by the operation of the signaling device to control the energy from the independent source, and means actuated by the energy which transmits a distant signal to prevent the operation of said energy-controlling means.

5. In a measured-service signaling system, a recording device, means actuated entirely by current in an independent local circuit for operating said recording device, a signal-circuit, and means in the signal-circuit for interrupting the local circuit.

6. In a recording system, a recording device and means for effecting the operation thereof, said operating means including means for moving a member of the recording device, means for returning said member to its initial position, and means including an electromagnetically-actuated time lag for actuating said returning means.

7. The combination with a call-recording device for signaling systems, of electromagnetically-actuated means for producing a time lag in the operation of said call-recording device.

8. The combination with a call-recording device for signaling systems, of electromagnetically-actuated means for producing a regulable time lag in the operation of said recording device.

9. In a measured-service telephone system, a recording device controlled by the operation of the subscriber's telephone, and electromagnetically-actuated means for producing a time lag in the operation of said recording device.

10. In a measured-service telephone system, a recording device controlled by the operation of the subscriber's telephone, and adjustable electromagnetically-actuated means for producing a time lag in the operation of said recording device.

11. In a measured-service telephone system, a recording device located at the subscriber's station and automatically actuated by the operation of the subscriber's telephone, and means under the control of the operator at the central station for preventing the operation of the recording device.

12. In a measured-service magneto-call telephone system, a recording device normally actuated by the operation of the subscriber's telephone, means for preventing the operation of the recording device, said means being actuated by current flowing in a shunt around the armature of the subscriber's magneto-machine, and means for automatically breaking the shunt when the handle of the magneto-machine is turned.

13. In a measured-service signaling system, normally inert signaling apparatus including a movable part for placing said apparatus in condition for signaling, a recording device actuated by said movable part, and means controlled by a further movement of said movable part to restore said recording device to its initial position.

14. In a measured-service signaling system, a signaling apparatus including a movable part, contacts in the path of movement of said part, a circuit completed by the closing of said contacts to actuate a recording device, additional contacts also in the path of movement of said movable part, and a circuit completed by the closure of said additional contacts to restore the recording device to its initial position.

15. In a measured-service telephone system, a recording device actuated by the movement of a receiver-arm in one direction, means actuated by the movement of the receiver-arm in the opposite direction to restore the recording device to its initial position, and means beyond the control of the operator to prevent the actuation of the recording device by the movement of the receiver-arm.

16. In a measured-service signaling system, a recording device and means to effect the actuation thereof, said means including an electromagnet capable of being energized by current in a local circuit to further the operation of said recording device, and also capable of being energized by a current from the line to prevent the operation of said recording device.

17. In a measured-service signaling system, a recording device and means to effect the operation thereof, said means including an electromagnet which when energized by current in one circuit acts directly upon the recording device, and when energized by current in a second circuit acts to interrupt the first-named circuit.

18. In a measured-service signaling system, a recording device and means to effect the operation thereof, said means including an electromagnet having two windings, one winding in a local circuit which energizes the magnet to move a part of the recording device, and the other winding included in the line-circuit and energizing the magnet to break a second local circuit containing a magnet which also acts to move a part of the recording device.

19. In a measured-service telephone system, an electrically-actuated call-recording device, contacts closed by the movement of a receiver-arm in one direction, a circuit completed by the closure of said contacts to actuate the recording device, an electromagnet for interrupting said circuit, said electromagnet being connected to line, contacts closed by the movement of the receiver-arm in the other direction, a circuit completed by the closure of said second contacts, said circuit including an electromagnet, a circuit containing contacts closed by said electromagnet, said circuit including means for returning the recording device to its initial position, and adjustable means for retarding the circuit-closing movement of the second electromagnet.

20. In a measured-service telephone system, an electrically-actuated call-recording device, contacts closed by the movement of the receiver-arm in one direction, a circuit completed by the closure of said contacts to actuate the recording device, contacts closed by the movement of the receiver-arm in the other direction, a circuit completed by the closure of said second contacts, said circuit including an electromagnet, a circuit containing contacts closed by said electromagnet, said circuit including means for returning the recording device to its initial position, and means for retarding the circuit-closing movement of the electromagnet.

21. In a measured-service telephone system, a recording device operated by a magnet in a local circuit, contacts to complete said local circuit closed by the movement of the receiver-arm which places the telephone in condition for use, an electromagnet in a second local circuit for restoring the recording device to its initial position, contacts to complete said second circuit and closed by the movement of the receiver-arm which puts the telephone out of condition for use, and a relay operated by current from the line to open the first local circuit and prevent the operation of the recording device when a subscriber answers a call.

22. In a measured-service signaling system, a signaling device including a movable part, a recording device, means controlled by the movement of said movable part in one direction to actuate said recording device to perform part of the movements necessary to its complete operation, means actuated by a movement of said movable part in a reverse direction to cause the recording device to complete its operation after a predetermined lapse of time, and means actuated by a movement of said movable part in the initial direction during said lapse of time to prevent the operation of the means which would normally cause said recording device to complete its movement after said lapse of time.

23. In a measured-service signaling system, a signaling device including a movable part, an electrically-controlled recording device, a circuit therefor, and contacts in said circuit so arranged as to be closed by said movable part during its movement from one position to another, and to be opened when the movable part is at rest in either position.

24. In a measured-service telephone system, a telephone, an electrically-controlled recording device and a circuit therefor, and contacts in said controlling-circuit so arranged as to be closed by the movement of the receiver-arm from one position to another and to be open when the receiver-arm is at rest in either position.

25. In a measured-service telephone system, a telephone, an electrically-controlled recording device and circuits therefor, contacts in one of said controlling-circuits so arranged as to be closed by the receiver-arm during its movement which connects the receiver to line, and contacts in another of said controlling-circuits so arranged as to be closed by the receiver-arm during its movement which disconnects the receiver from line, both of said sets of contacts being so arranged as to be open when the receiver-arm is at rest in either position.

In testimony whereof we have signed our names to this specification in the presence of the subscribing witnesses.

ROBERT DAVIS.
WM. HAMMATT DAVIS.
DANIEL C. WOODBURY.

Witnesses to the signatures of Robert Davis and William Hammatt Davis:
MARCUS C. HOPKINS,
JOHN W. TUCKER.

Witnesses to the signature of Daniel C. Woodbury:
MONCURE C. CARPENDER,
ARTHUR F. PITKIN.